(12) United States Patent
Makigaki (10) Patent No.: US 7,034,981 B2
(45) Date of Patent: Apr. 25, 2006

(54) OPTICAL MODULATOR, DISPLAY DEVICE AND MANUFACTURING METHOD FOR SAME

(75) Inventor: Tomohiro Makigaki, Nagano-ken (JP)

(73) Assignee: Seiko Epson Corporation, (JP)

( * ) Notice: Subject to any disclaimer, the term of this patent is extended or adjusted under 35 U.S.C. 154(b) by 2 days.

(21) Appl. No.: 10/758,700

(22) Filed: Jan. 15, 2004

(65) Prior Publication Data
US 2004/0184134 A1   Sep. 23, 2004

(30) Foreign Application Priority Data
Jan. 16, 2003   (JP)   ............................. 2003-008766

(51) Int. Cl.
   *G02B 26/00*   (2006.01)
(52) U.S. Cl. ...................... 359/290; 359/237; 359/291; 359/292; 359/295; 359/298
(58) Field of Classification Search ................ 359/290, 359/291, 292, 245, 248, 223, 224, 332, 237, 359/295, 298; 353/30, 31, 97, 98, 99
See application file for complete search history.

(56) References Cited

U.S. PATENT DOCUMENTS

| 5,835,255 | A | 11/1998 | Miles |
| 5,841,579 | A | 11/1998 | Bloom et al. |
| 5,986,796 | A | 11/1999 | Miles |
| 6,040,937 | A | 3/2000 | Miles |
| 6,055,090 | A | 4/2000 | Miles |
| 6,094,294 | A * | 7/2000 | Yokoyama et al. ......... 359/290 |
| 6,172,797 | B1 * | 1/2001 | Huibers ...................... 359/291 |
| 6,307,663 | B1 * | 10/2001 | Kowarz ...................... 359/231 |
| 6,747,784 | B1 * | 6/2004 | Little et al. ................. 359/290 |
| 6,747,786 | B1 * | 6/2004 | Murakami et al. .......... 359/291 |

FOREIGN PATENT DOCUMENTS

| CN | 1187247 A | 7/1998 |
| CN | 1277142 A | 12/2000 |
| JP | 2000-272120 | 10/2000 |
| WO | WO 97/17628 | 5/1997 |

* cited by examiner

*Primary Examiner*—Hung Xuan Dang
*Assistant Examiner*—Tuyen Tra
(74) *Attorney, Agent, or Firm*—Harness, Dickey & Pierce, P.L.C.

(57) ABSTRACT

An optical modulator is provided which can be manufactured by means of a simple process, and a display device, and a method of manufacturing same. The optical modulator comprises a first substrate having a movable reflective film that oscillates in accordance with the application of an electrostatic force; a light-transmitting second substrate disposed so as to oppose the first substrate and formed with a transparent electrode for applying the electrostatic force, in a position corresponding to the movable reflective film; and a cavity section, demarcated by the first substrate and the second substrate, for restricting the range of oscillation of the movable reflective film. By forming a movable reflective film by a portion of the substrate and determining the range of oscillation of the movable reflective film by the interval between the substrates, an optical modulator of high durability and high precision can be obtained.

9 Claims, 9 Drawing Sheets

X-X CROSS-SECTION

FIG.3B

Y-Y CROSS-SECTION

OPTICAL MODULATOR, DISPLAY DEVICE AND MANUFACTURING METHOD FOR SAME

RELATED APPLICATIONS

The present application claims priority to Japanese Patent Application No. 2003-008766 filed Jan. 16, 2003 which is hereby expressly incorporated by reference in its entirety.

BACKGROUND OF THE INVENTION

1. Field of the Invention

The present invention relates to an optical modulator which can be used for displaying still images, moving images and displays of other kinds, and more particularly, to improvements in an optical modulator and display device using an interference optical modulation, and to a method of manufacturing same.

2. Description of the Related Art

An optical modulator generates desired intensity and colouring, and the like, in transmitted light, by changing the optical parameters, such as the transmittance, refractive index, reflectivity, polarisation rate, interference, and the like, of light in an optical system.

For example, an optical modulator based on light interference uses a reflective film whose position alters slightly in accordance with a modulating signal to create two superimposed light waves having different light paths, and it alters the intensity and color of the light by means of the interference between the two waves. In an interference optical modulator of this kind, it is necessary to provide a mechanism that causes the reflective film to oscillate in an accurate manner between two positions separated by a very small distance.

For example, the optical modulator disclosed in PC (WO) [Published Japanese translation of PCT application] No. 2000-500245 has a structure wherein a reflective film is changed between a distal position and a position of intimate contact with an dielectric absorber, and the reflective film, dielectric absorber, and the like, are formed on a substrate by repeating processes of forming layers on the substrate and then patterning, and the like, using semiconductor process technology.

SUMMARY OF THE INVENTION

However, the manufacturing process for an interference optical modulator is a complicated one comprising repeated deposition of films having different functions, followed by etching, patterning, and the like, onto the same substrate, and hence it requires significant manufacturing time and the manufacturing costs become high. Moreover, since the lifespan of an optical modulator is substantially determined by the number of oscillations that can be performed by the reflective film, then it is desirable to form a reflective film of higher reliability.

Therefore, it is an object of the present invention to provide an optical modulator requiring a more simple manufacturing process.

Moreover, it is a further object of the present invention to provide an optical modulator having a reflective film of greater reliability.

Furthermore, it is yet a further object of the present invention to provide an optical modulator which enables the range of oscillation of the reflective film to be determined accurately.

In order to achieve the aforementioned objects, the optical modulator of the present invention comprises: a first substrate having a movable reflective film that oscillates in accordance with the application of an electrostatic force; a light-transmitting second substrate disposed so as to oppose the first substrate and formed with a transparent electrode for applying the electrostatic force, in a position corresponding to the movable reflective film; and a cavity section, demarcated by the first substrate and the second substrate, for restricting the range of oscillation of the movable reflective film.

By adopting this constitution, since a cavity section which restricts the range of oscillation of the movable reflective film is formed by the first substrate and the second substrate, it is possible to demarcate the cavity with good accuracy, and hence the positions (range) of oscillation of the movable reflective film can be specified accurately and hence color reproduction can be improved. Moreover, by forming a movable reflective film by means of a portion of a substrate, it is possible to obtain a reflective film of greater durability than in a case where a movable reflective film is formed by film deposition, and therefore an optical modulator having an even more reliable reflective film can be provided.

The cavity section for restricting the range of oscillation of the movable reflective film may be constituted by a recess section or groove section provided in the second substrate, and a flat face of the first substrate, the movable reflective film being formed in a position of the first substrate corresponding to an opening of the recess section or groove section in the second substrate.

Moreover, the cavity section for restricting the range of oscillation of the movable reflective film may be constituted by a recess section or groove section provided in the first substrate, and a flat face of the second substrate, the movable reflective film being formed on the face of the recess section or groove section in the first substrate.

Furthermore, the cavity section for restricting the range of oscillation of the movable reflective film may be constituted by a recess section or groove section provided in the first substrate, and a recess section or groove section provided in the second substrate, the face of the recess section or groove section in the first substrate being formed as the movable reflective film.

Furthermore, the optical modulator of the present invention comprises: a first substrate having, on one face thereof, a single first groove or a plurality of first grooves, each having a movable reflective film that oscillates in accordance with electrostatic force formed on the bottom face thereof; and a light-transmitting second substrate, positioned so as to oppose the first substrate, having a single second groove or a plurality of second grooves provided on the face thereof opposing the first substrate, each of the second grooves extending in a direction approximately orthogonal to the first grooves and having a transparent electrode formed on the bottom face thereof.

By adopting a constitution of this kind, since the cavity section for restricting the range of oscillation of the movable reflective film is formed by grooves formed in the first substrate and the second substrate, the cavity section can be demarcated with very good accuracy and hence the oscillation positions of the movable reflective film can be specified accurately and the color reproduction characteristics can be improved. Moreover, by providing a plurality of first grooves and second grooves, since a picture element is formed at each intersection between a first groove and a second groove, then it is possible to form a plurality of picture elements having improved color reproduction characteristics, simultaneously, by means of a simple method.

The movable reflective film may be formed from either a conductive film, or a semiconductor film doped with an impurity, or a dielectric film, or a laminated film combining these films. Thereby, it is possible to obtain a movable reflective film of desired characteristics.

The first substrate may be formed from a semiconductor substrate. Moreover, the movable reflective film may be formed using a portion of a semiconductor substrate. By using a semiconductor substrate, it is possible to use semiconductor manufacturing processes, and hence ease of processing and durability can be enhanced. It is particularly beneficial if a monocrystalline silicon substrate is used, as this allows a movable reflective film of high quality to be obtained, and makes it possible to compose an optical modulator having a long lifespan.

The first substrate may be formed from a semiconductor substrate of one polarity, the movable reflective film being formed from a semiconductor film of the other polarity.

By adopting this constitution, since a P-N junction is formed between the first substrate and the movable reflective film, it is possible to insulate the substrate from the movable reflective film. Thereby, even if a voltage is applied to the movable reflective film, this voltage will not affects any regions other than the movable reflective film, and hence it is possible to drive a plurality of movable reflective films, independently.

Desirably, the first substrate and the second substrate are bonded together by anodic bonding. Thereby, it is possible to bond the substrate without using an adhesive, or the like. Since it is not necessary to take into account the variation in the height of the cavity section caused by the thickness of the bonding layer, then a merit is obtained in that the height of the cavity section can be adjusted with greater accuracy.

Desirably, the second substrate is made of borosilicate glass. Borosilicate glass contains a large number of alkali ions, and not only is it suitable for anodic bonding, but also since its coefficient of thermal expansion virtually matches that of the silicon substrate, little distortion occurs at the bonding faces of the substrates, and hence the substrates can be bonded accurately and reliably.

Desirably, a light absorber is formed on the upper face of the transparent electrode. If the movable reflective film makes close contact with a light absorber, then light of the intrinsic wavelength of the light absorber is absorbed and attenuated in the light incident via the first substrate and the light reflected by the movable reflective film, and thereby it is possible to form a state of low brilliance, and to adjust the colouring.

The display device according to the present invention is formed by incorporating an optical modulator as described above. Since the display device according to the present invention is formed by incorporating an optical modulator as described above into a display section, then it is possible to provide an image of even higher quality. Moreover, product lifespan is also increased.

The method of manufacturing an optical modulator according to the present invention comprises: a first substrate forming step for forming a first substrate having a movable reflective film that oscillates in accordance with the application of electrostatic force; a second substrate forming step for forming a second substrate comprising a transparent electrode for applying the electrostatic force; and a bonding step for bonding the first and second substrates together in mutually aligned positions in such a manner that the movable reflective film and the transparent electrode oppose each other.

In this way, since the first substrate having a movable reflective film and the second substrate comprising a transparent electrode can be fabricated in a parallel fashion by means of separate processes, it is possible to shorten the manufacturing time. Furthermore, since the movable reflective film can be fabricated without film deposition processes, it is possible to manufacture the optical modulator by means of simple processes.

Moreover, desirably, the first substrate forming step comprises the steps of: forming an etching prevention film by doping an impurity into the region on one side of a semiconductor substrate on which the movable reflective film is to be formed; and forming a movable reflective film by performing etching of the semiconductor substrate from the other side of the semiconductor substrate until the etching preventing film, and making the etching prevention film oscillatable. Thereby, since an etching prevention film can be used as a movable reflective film, it is possible to adjust the thickness of movable reflective films accurately and then it is possible to manufacture the optical modulator by means of simple process. Furthermore, since a P-N junction can be created between the movable reflective film and the first substrate by selecting a suitable impurity, and this junction can be electrically insulated, then even if a plurality of movable reflective films are formed on the first substrate, it is still possible to manufacture an optical modulator wherein each movable reflective film can be driven respectively and independently, without affecting the others.

Moreover, it is also possible further to comprise the step of forming an insulating film on the etching prevention film. By this means, even if the movable reflective film makes contact with the transparent electrode film forming the driving electrode, or with the light absorber, it is possible to prevent the occurrence of shorting.

Desirably, the second substrate forming step comprises the steps of:

forming a recess section or groove section by patterning a transparent substrate in accordance with the disposition of the movable reflective film in the first substrate; forming a transparent electrode film inside the recess section or groove section of the transparent electrode; and forming an absorbing film for absorbing incident light under prescribed conditions, on the transparent electrode film inside the recess section or groove section of the transparent substrate. Since the cavity section which determines the accuracy of color reproduction is formed by means of a recess section or groove section, it is possible to achieve greater forming precision and to improve the quality of color reproduction, yet further, compared to a case where the cavity section is formed by film deposition.

DESCRIPTION OF THE PREFERRED EMBODIMENTS

Figure 1A:
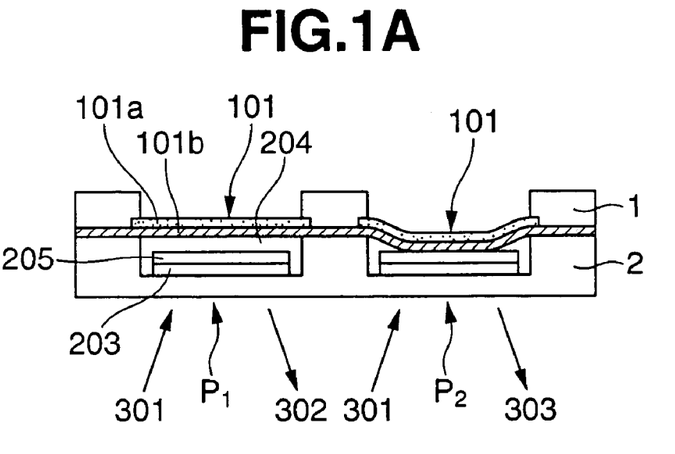
FIG. 1 is a diagram for describing an optical modulator according to an embodiment of the present invention.
Figure 1B:
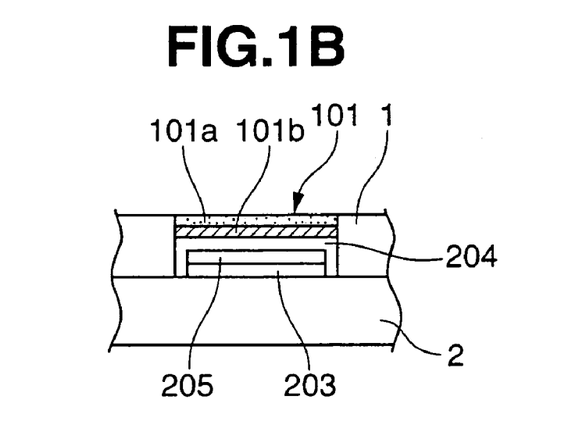
Figure 1C:
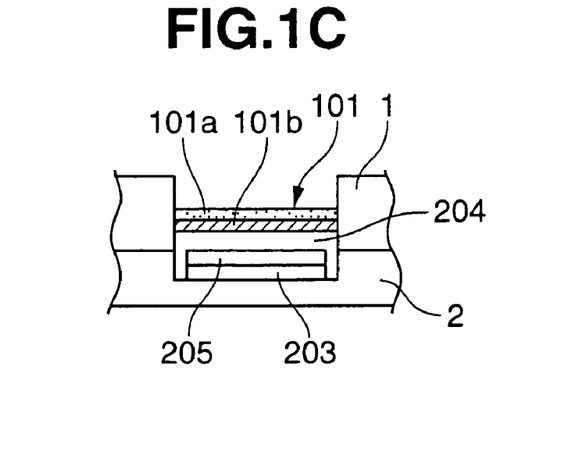

FIG. 1 is an illustrative diagram for describing an optical modulator according to an embodiment of the present invention, FIG. 1A is a cross-sectional diagram for describing the structure and the operational mechanism of an optical modulator according to the present embodiment, and FIGS. 1B and C are cross-sectional diagrams for illustrating a further embodiment of the optical modulator.

Firstly, the structure and operational mechanism of the optical modulator according to the present embodiment are described with respect to FIG. 1A.

As shown in this diagram, the optical modulator is formed by joining a first substrate 1 and a second substrate 2, and comprises a cavity section 204 demarcated by the first substrate 1 and the second substrate 2. A transparent electrode 203 and a light absorber 205 are formed inside this cavity section 204.

The first substrate 1 is formed, for example, by a semiconductor substrate, and more specifically, by an N-type silicon substrate, a recess section or groove section being formed on one face of this substrate. The bottom face of the recess section or groove section is formed as a movable reflective film 101 which oscillates (fluctuates) under the effect of electrostatic force. The first substrate 1 may also be formed by another semiconductor substrate, or the like, other than an N-type silicon substrate. If a silicon substrate is used, then a substrate having a crystal orientation of (110) or (100), or the like, may be used, and from the viewpoint of fabrication accuracy, a substrate with (110) orientation is especially suitable. In particular, in cases where an optical modulator is used in an image display device, the fact that fabrication accuracy is improved means that greater density of picture elements can be achieved.

The movable reflective film 101 is constituted, for example, by laminating together a semiconductor film 101*a* of silicon, or the like, doped with a P-type impurity, and a dielectric film 101*b*. The dielectric film 101*b* may be made using $SiO_2$, $Si_3N_4$, or the like, for example. By providing a dielectric film 101*b* on the silicon film 101*a*, electrical insulation is ensured, and breakdown of the insulation between the silicon film 101*a* and the transparent electrode 203, or shorting between same, is prevented. Moreover, in order to improve reflectivity yet further, it is also possible to form a conductive film using a metal such as silver, gold, platinum, or the like, on the dielectric film 101*b*. Furthermore, since the movable reflective film 101 performs a mechanical action and frequently makes contact with the transparent electrode 203 or the light absorber 205 on the second substrate 2, then it is necessary for this film to have high durability, in addition to having enhanced reflectivity. From this viewpoint, desirably, a monocrystalline substrate, for example, a monocrystalline silicon substrate is desirable. The composition of the movable reflective film 101 is not limited to that described above. Therefore, the movable reflective film 101 may also be formed from a conductive film (metallic film), a semiconductor film doped with an impurity, or a dielectric film, or a laminated film combining same.

In the present embodiment, as described above, a first substrate 1 is formed from N-type silicon, and the silicon film 101*a* is doped with a P-type impurity, whereby a P-N junction is formed between the substrate 1 and the silicon film 101*a*. Therefore, if a reverse bias with respect to the P-N junction can be created, when a voltage is applied to the silicon film 101*a*, then leakage of current to any element apart from the silicon film 101*a* can be restricted to a minimum. In the present embodiment, a silicon film doped with a P-type impurity is provided on a first substrate consisting of an N-type silicon substrate (semiconductor substrate), but it is also possible to provide a silicon film doped with an N-type impurity (semiconductor film) on a first substrate consisting of a P-type silicon substrate.

The second substrate 2 is made from a transparent material which transmits light. For example, a virtually transparent member made of glass, plastic, or the like, can be used for this material. A recess section or groove section is formed in the second substrate 2 in a position corresponding to the movable reflective film 101, and a two-layer film having a transparent electrode 203 as a lower layer and a light absorber 205 as an upper layer is formed in a position to the inner side of the recess section or groove section and opposing the movable reflective film 101, distanced from same by an interval determined by the size of the cavity section 204. It is possible to use Indium Tin Oxide (ITO), for example, for the transparent electrode 203. When the light absorber 205 is in close contact with the movable reflective film 101, it reduces the reflectivity thereof, or alternatively, it absorbs and attenuates light of the intrinsic wavelength of the light absorber. A light absorber 205 of this kind is made, for example, by incorporating a metallic film or tungsten, or the like, a semiconductor film, or a laminated film combining these films, or the like. Moreover, the light absorber 205 may be formed by also incorporating a film which allows the difference in refractive index between the movable reflective film 101 and the transparent electrode 203 to be adjusted, for example.

Next, the operational mechanism of the aforementioned optical modulator will be described.

By alternately applying a voltage between the transparent electrode 203 and the movable reflective film 101, and halting that voltage (that is, not applying a voltage therebetween), the movable reflective film 101 can be made to oscillate within the interval provided by the cavity section (range of oscillation). In other words, by applying a potential difference between the transparent electrode 203 and the movable reflective film 101, the movable reflective film 101 is drawn towards the transparent electrode (opposing electrode) 203 by electrostatic force and is caused to make contact with the opposing electrode 203, and when the potential difference is released, the movable reflective film 101 which has been in contact with the opposing electrode 203 returns to its original position due to the restoring force thereof.

In an optical modulator of this kind, since the movable reflective film 101 and the opposing electrode 203 repeatedly make contact each time a potential difference is applied and released, then it is conceivable that the movable reflective film and the electrode will stick together and become difficult to separate. However, according to the present invention, a structure is adopted wherein the periphery of the movable reflective film is supported by the substrate, and hence the fixing force of the substrate can be utilised to make the movable reflective film return to its original position. Consequently, the reliability of the movable reflective film is improved and it becomes able to withstand use over a long period of time.

In FIG. 1A, the pixels (elements) $P_1$, $P_2$ respectively illustrate the position of the movable reflective film 101 when no voltage is applied, and when a voltage is applied.

As shown by the picture element $P_1$ in the diagram, the movable reflective film 101 formed on the first substrate 1 and the transparent electrode 203 formed in the recess section or groove section in the second substrate 2 are mutually opposing via an interval formed by the cavity section 204. If the height of the interval formed by the cavity section 204 is set appropriately in such a manner that it is approximately equal to the wavelength of visible light, then incident light 301 (for example, white light) which is incident from the outer side of the base portion of the second substrate 2, is reflected by the surface of the second substrate 2, and this reflection is repeated inside the cavity section 204, whereupon the light exits the substrate. Since the reflected light waves interfere with each other and are thereby modulated, from an external position, a coloured light 302 is observed. Here, the interval formed by the cavity section 204 indicates the distance between the movable reflective film 101 when in a stationary state and the uppermost film provided on the recess section or groove section of the second substrate 2 (in the case of the present embodiment, the light absorber 205). Therefore, in practical terms, if it is sought to set the reflected light to be, for example, blue light, green light, red light or white light, then the aforementioned distance in the respective picture element should be set, respectively, to approximately 325 nm, 435 nm, 230 nm or 700 nm, for example, whereby the desired color can be represented. This distance is determined by the depth of the recess section or groove section provided in the second substrate 2 forming the cavity section 204 and the thickness of the film formed by the transparent electrode 203 and light absorber 205, or the like, provided in the recess section or groove section. The cavity section 204 may be determined substantially by the shape of the recess section or groove section provided in the substrate, and consequently, there is virtually no change in the interval formed by the cavity section, even after a long period of use. Moreover, since the recess section or groove section, and the transparent electrode, and the like, can be formed accurately by means of simple processes, it is possible to represent desired colours with a higher degree of accuracy.

Furthermore, provided that the object of the present invention can be achieved, the light source is not limited to being a white light source, and a light source of a color suited to the objective can be used.

Next, if a voltage is applied between the movable reflective film 101 and the transparent electrode 203, then as illustrated by the picture element $P_2$ in the diagram, the movable reflective film 101 is drawn towards the transparent electrode 203 by electrostatic force and makes contact with same. In this case, the interval between the movable reflective film 101 and the transparent electrode 203 becomes virtually zero, and the state of interference of the reflected light 303 changes. Therefore, the reflected light 303 is observed as light of a color that is different from the light color before the voltage was applied, for example, a coloured light that differs from the incident light, or black or white light, or the like. In this way, by applying a potential difference between the movable reflective film 101 and the transparent electrode 203, it is possible to modulate the light emitted from the second substrate 2.

The cavity section 204 which determines the color of the light observed in this way is not limited to the embodiment described above, provided that it is demarcated by the first substrate 1 and the second substrate 2.

For example, as shown in FIG. 1B and FIG. 1C, the cavity section 204 may also be formed in the first substrate 1, or it may be formed extending between both the first substrate 1 and the second substrate 2. Furthermore, a cavity section 204 may also be created by forming recess sections or groove sections from either side of the first substrate 1, creating a movable reflective film 101 on the bottom face of these recess sections or groove sections, and then covering over one of the recess sections or groove sections by means of the plane face of the second substrate 2. In this case, a two-layer film having a transparent electrode 203 as a lower layer and a light absorber 205 as an upper layer is formed in a position corresponding to the recess section or groove section of the first substrate 1 over the second substrate 2.

As shown in FIG. 1C, it is also possible to form recess sections or groove sections from either side of the first substrate 1, create a movable reflective film 101 on the bottom face of the recess sections or groove sections, and then join the first substrate 1 with a second substrate 2 in such a position that the opening of a recess section or groove section provided in the second substrate 2 opposes the opening of the recess section or groove section on one of the faces of the first substrate 1, thereby creating a cavity section 204. In this case, it is possible to form a two-layer film comprising a transparent electrode 203 as a lower layer and a light absorber 205 as an upper layer on the bottom face of the recess or groove provided in the second substrate 2.

As illustrated in FIG. 1, in the present embodiment, a case was described in which the cross-sectional shape of the recess section or groove section formed in the first substrate 1 or second substrate 2 is a rectangular shape, but provided that the objects of the present invention can be achieved, the shape of the recess section or groove section is not limited in particular. Therefore, the cross-sectional shape (in the case of a groove section, the cross-sectional shape perpendicular to the longitudinal direction) may be a rectangular shape, a square shape, a trapezoid shape, or a U-shape, or the like. However, in view of the ease of oscillation of the movable reflective film, desirably, the cross-section thereof is a rectangular shape, a square shape, or a trapezoid shape. These angles formed between the side faces and the bottom face of the recess section or groove section are not limited in particular, provided that the objects of the present invention can be achieved, but from the viewpoint of the ease of oscillation of the movable reflective film, and the ease of fabricating same, and the like, it is desirable to form these angles to a right-angle or obtuse angle. Furthermore, the recess section or groove section may have an open end. More specifically, either one end or both ends of the groove section may be open ends.

A display device can be formed by using the mechanism of an optical modulator of this kind, and taking an optical modulator as a picture element (pixel). In other words, the optical modulator according to the present invention may function as one picture element or a plurality of picture elements of a display device. Moreover, the aforementioned embodiment described an optical modulator which corresponds to a single picture element, but an optical modulator may also correspond to a plurality of picture elements. More specifically, it is possible to constitute an optical modulator which comprises a first substrate having on one face thereof, a single first groove or a plurality of first grooves each having a movable reflective film which is caused to oscillate by electrostatic force formed on the bottom face thereof, and a transparent substrate positioned opposing the first substrate and having a single second groove or a plurality of second grooves, each extending on the face opposing the first substrate in a direction approximately orthogonal to the first groove or grooves, and each having a transparent electrode formed in the bottom face thereof. In this way, by having a plurality of first grooves and a plurality of second grooves in the first substrate and the second substrate, the respective intersections can be made to function as picture elements, and hence a plurality of picture elements (display screen) which can be optically modulated and which have a simple structure and good accuracy can be provided.

Next, the display device relating to the present invention will be described with reference to FIG. 2 and FIG. 3.

Figure 2:
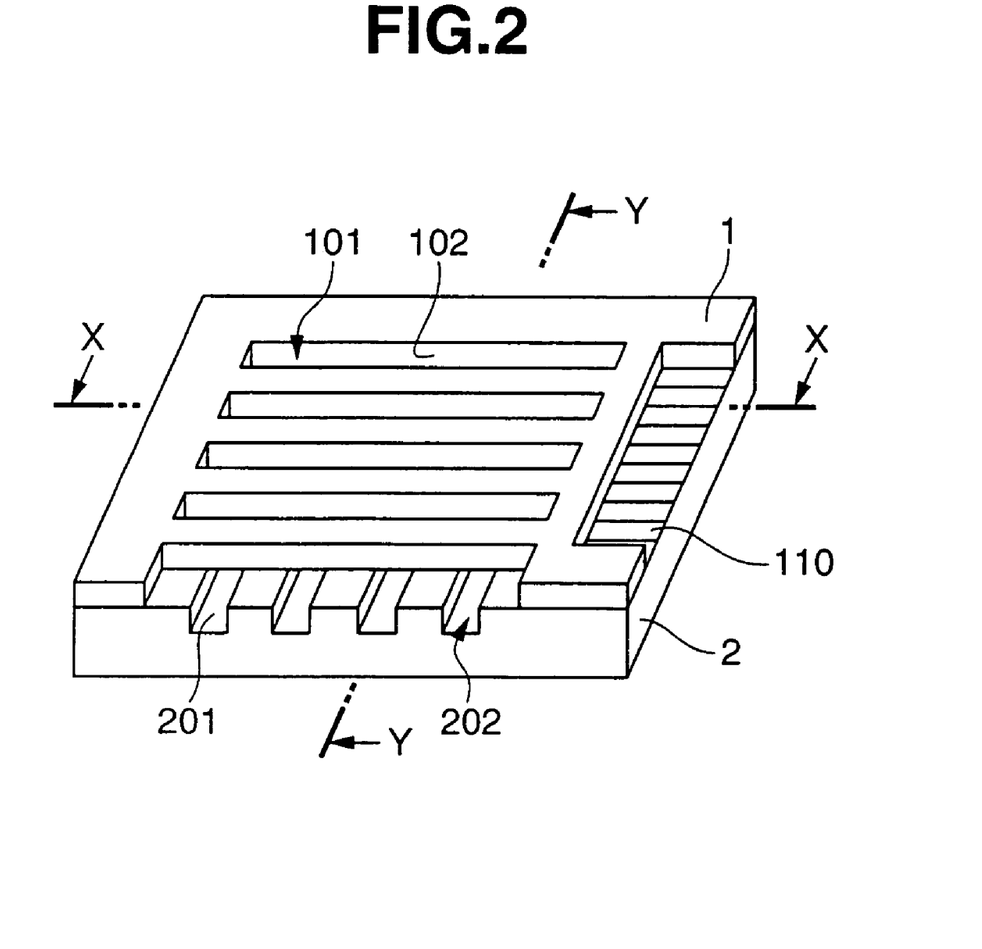
FIG. 2 is an oblique view for describing a display device according to the present invention formed by means of an optical modulator having a plurality of grooves.

FIG. 2 is an oblique view for illustrating a display device according to the present invention formed by means of an optical modulator having a plurality of grooves.

As shown in this diagram, the display device according to the present invention comprises, for example, a first substrate 1 made of an N-type monocrystalline silicon substrate and a second substrate 2 made of a transparent member (for example, glass, or the like). A plurality of first grooves 102, each having a movable reflective film 101 which oscillates under the effect of electrostatic force formed on the bottom face thereof, are provided on one face of the substrate 1, and a plurality of second grooves 202 are provided on the face of the second substrate 2 which opposes the first substrate 1 when the second substrate 2 is positioned against same, in such a manner that they extend in a direction approximately orthogonal to the grooves 102. A transparent electrode 203 and a light absorber 205 (see FIG. 3) are formed on the bottom face of each of the grooves 202.

Each intersection between the plurality of grooves 102 and the plurality of grooves 202 functions respectively as a picture element. The transparent electrode 203 forms a wiring terminal 201 for external connection, at the end portion of the second substrate 2. By driving these picture elements, respectively and independently, it is possible to display an image or text, or the like.

Figure 3A:
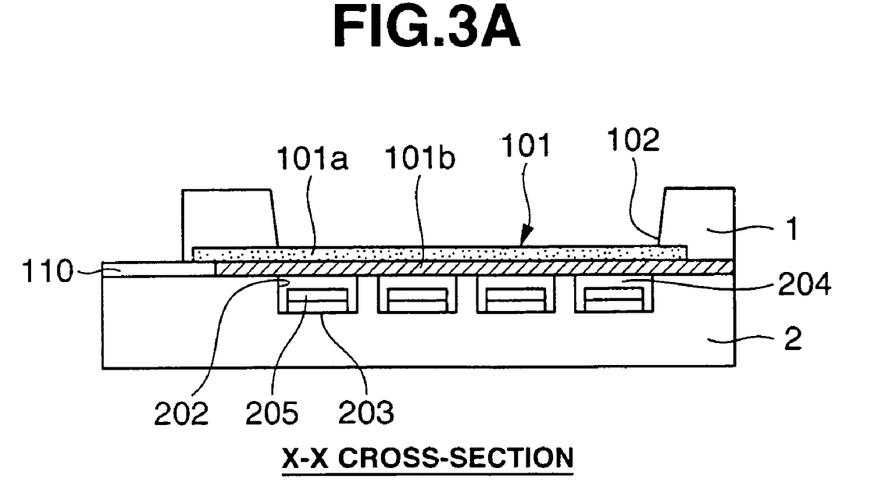
FIG. 3 is a cross-sectional view of a display device according to the present invention.

FIG. 3A is a cross-sectional diagram along the plane X—X in FIG. 2. A movable reflective film 101 is provided on the base portion of the groove 102 formed in the first substrate 1 which is made from N-type monocrystalline silicon. The movable reflective film 101 is formed from an impurity diffusion layer 101a and an insulating film (dielectric film) 101b. A P-type impurity, such as boron, or the like, is diffused into the impurity diffusion layer 101a to such an extent that it does not infiltrate into the movable reflective films 101 in the base portions of the adjoining grooves 102. A P-N junction is formed by the impurity diffusion layer 101a having a P-type impurity and the substrate portion apart from this layer. By means of this P-N junction, when a voltage is applied to the movable reflective film 101, it is possible to prevent leakage of current from the movable reflective film 101 to the first substrate 1. Therefore, the plurality of movable reflective films 101 are electrically insulted from each other and can each be driven respectively and independently. Furthermore, as shown in FIG. 3A, by forming a suitable pattern, the movable reflective film 101 is connected to the connection terminal section (silicon substrate side terminal) 110 formed on the second substrate 2.

In order to prevent breakdown of insulation or shorting, the bottom face of the first substrate 1 is covered by an insulating film 101b. A silicon oxide ($SiO_2$) film, for example, can be used as this film 101b. The dielectric film 101b is partially removed in the contact section in order to connect the silicon substrate side terminal 110 and the P-type impurity diffusion section.

Cavity sections 204 are formed between the plurality of grooves 202 formed in the second substrate 2 and the bottom face of the first substrate 1 opposing same. A transparent electrode 203 and a light absorber 205 are disposed inside each groove 202. A prescribed space is provided between the base portion of the first substrate 1 and the light absorber 205.

The depth of the grooves in the second substrate 2 determines the range of oscillation of the movable reflective film, and is set in such a manner that the reflected light produced by reflection and interference of the incident light inside the cavity section 204 formed by the groove in the second substrate 2 and the movable reflective film 101 has a prescribed color on exiting the substrate. In practical terms, if it is sought to achieve reflected light that is blue, green, red or white, then the depth of the groove should be set respectively to approximately 325 nm, 435 nm, 230 nm or 700 nm, for example.

Figure 3B:
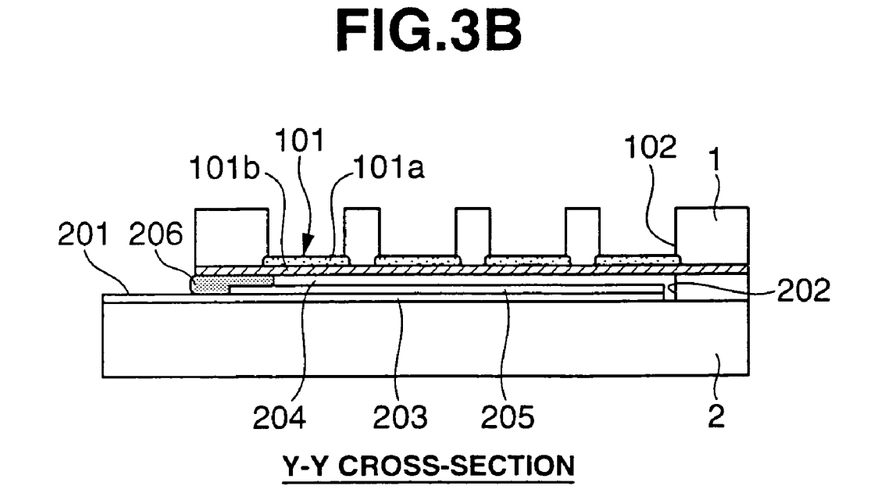

As shown in FIG. 3B, the groove 202 provided in the second substrate 2 is sealed by a sealant 206 on the connection terminal side 201, in order to seal it from the outside air. A material having suitable elasticity and excellent insulating properties should be used for the sealant material 206. For example, an epoxy resin, or the like, can be used. A gas, such as air, nitrogen, or the like, may be introduced into the groove 202.

In the example described above, a first substrate 1 fabricated from N-type monocrystalline silicon was described, but the invention is not limited to this. For example, it is also possible to use another silicon substrate, such as a polycrystalline silicon substrate, or another semiconductor substrate apart from silicon, and it is also possible to use an insulating substrate.

Furthermore, in the present embodiment, N-type monocrystalline silicon is used as the first substrate 1, and a P-type impurity is diffused into the base section of the first groove, but a P-N junction will also be formed if P-type monocrystalline silicon is used for the first substrate 1 and an N-type impurity is diffused into the base section of the first groove, and hence similar beneficial effects will be obtained.

According to embodiment described above, by using a semiconductor substrate, a P-N junction can be formed between the movable reflective film and the region apart from the movable reflective film, within the same substrate, and therefore it is possible to prevent the effects of the voltage applied to the movable reflective film from extending to regions other than the movable reflective film. Moreover, the movable reflective film and the portions other than this film can be formed on the same silicon substrate, and hence a first substrate comprising a movable reflective film having a conductive film can be manufactured by means of a relatively simple process. Moreover, since the first substrate and the movable reflective film are formed integrally, they have excellent strength.

FIG. 4 is a diagram illustrating the operational functions of the display device according to the present invention.

Figure 4A:
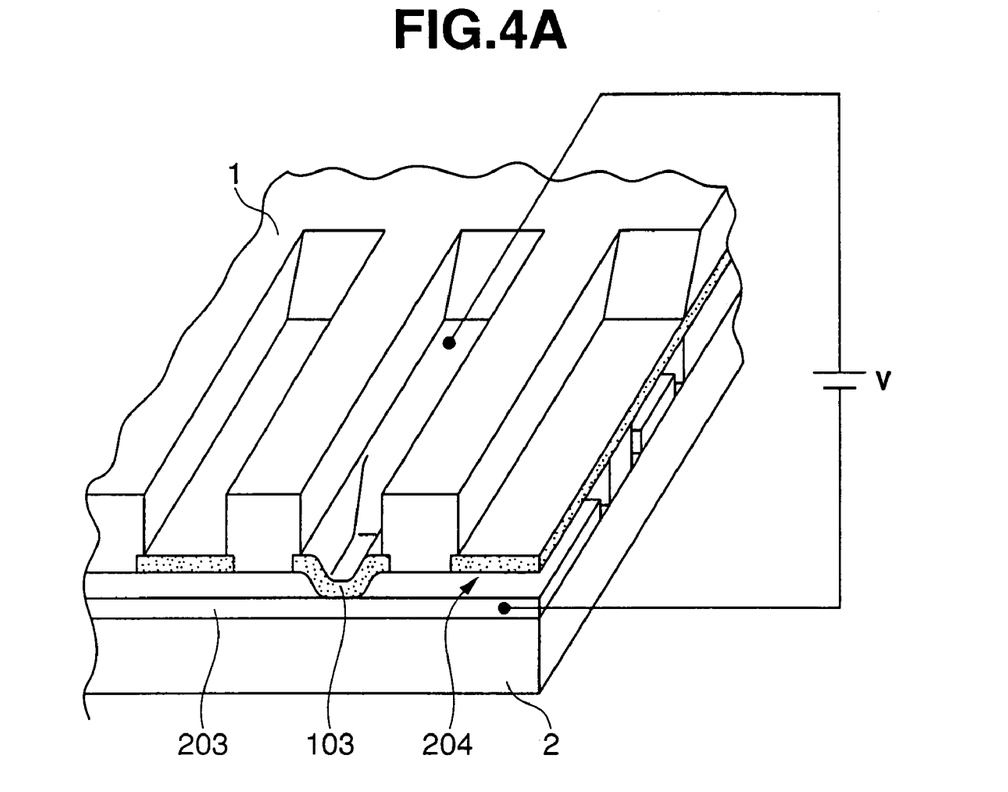
FIG. 4 is a diagram illustrating the operational mechanism of the display device according to the present invention.

FIG. 4A is a cross-sectional oblique view for describing the operational functions of the display device according to the present invention. As shown in the diagram, when a voltage is applied between one of the movable reflective films 101 on the first substrate 1 and one of the transparent electrodes 203 on the second substrate 2, the movable reflective film 101 is able to contact the transparent electrode 203 only at the position (picture element) where the movable reflective film 101 to which voltage has been applied intersects with the transparent electrode 203, and therefore, it is possible to drive particular picture elements only, in an independent manner.

Figure 4B:
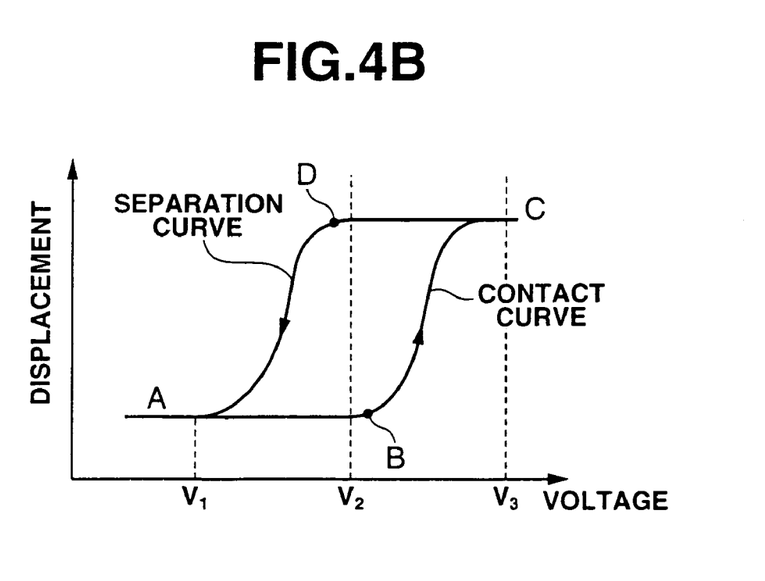

FIG. 4B is a diagram showing the hysteresis loop of the displacement of the movable reflective film and the applied voltage. As shown in the diagram, as the applied voltage V increases successively from $V_1$ to $V_2$ and $V_3$, so the movable reflective film 101 is displaced as shown by the curve A-B-C. In other words, from the point B where the applied voltage exceeds $V_2$ and the electrostatic force becomes greater than the elastic force (restoring force), the displacement of the movable reflective film 101 becomes extremely large in magnitude. At voltage $V_3$, the transparent electrode 203 makes complete contact with the movable reflective film 101. On the other hand, in the separating action, as the applied voltage gradually declines, then as indicated by the separation curve C-D-A, the electric charge between the contacting electrodes is maintained, and since the distance between the electrodes is small, the effect of the electrostatic force is large, and the electrodes separate at a voltage (point D) that is lower than $V_2$ and less than the voltage at which they make contact. In this way, although it is not possible to make the movable reflective film 101 change immediately from a separated state to a contact state, the voltage at which a contact state can be maintained is established as $V_2$.

Figure 5:
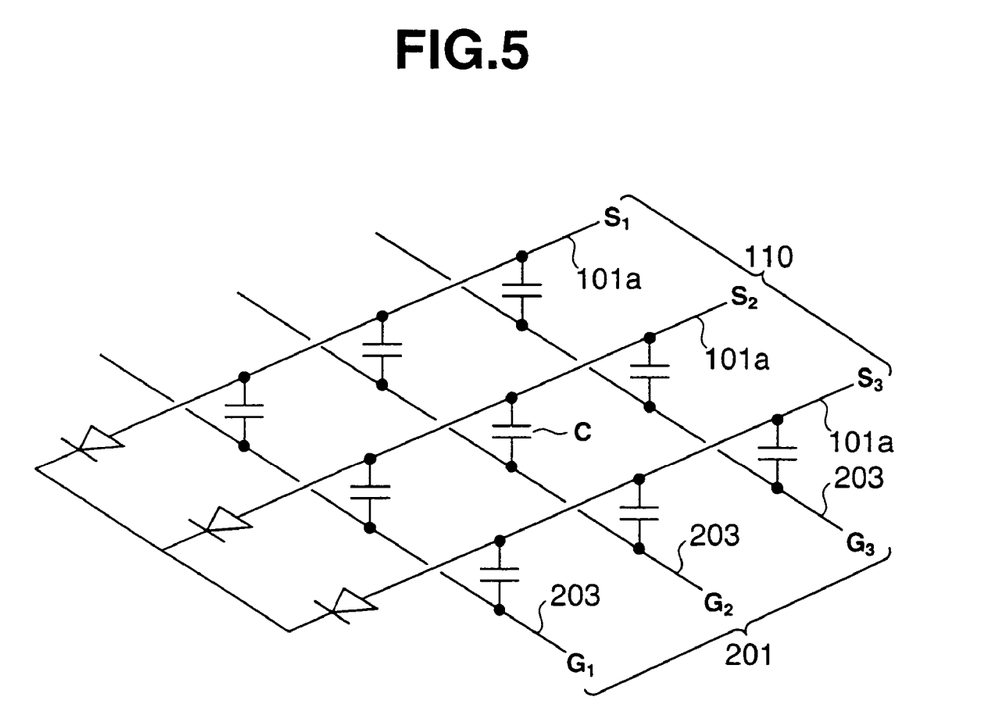
FIG. 5 is an equivalent electrical circuit diagram of a display device according to the present invention.
Figure 6A:
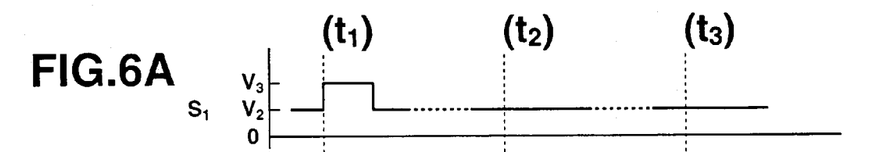
FIG. 6 is a timing chart showing the voltage timings at silicon substrate side terminals ($S_1$, $S_2$, $S_3$) and glass substrate side terminals ($G_1$, $G_2$, $G_3$)
Figure 6B:
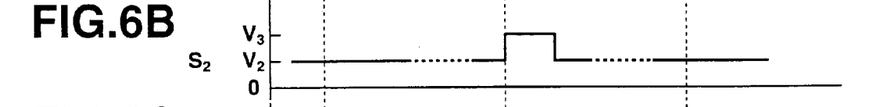
Figure 6C:
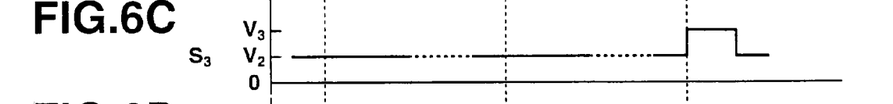
Figure 6D:
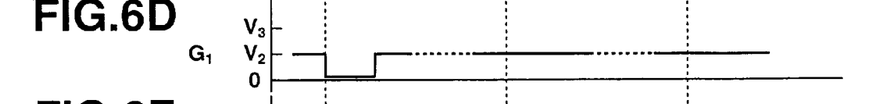
Figure 6E:
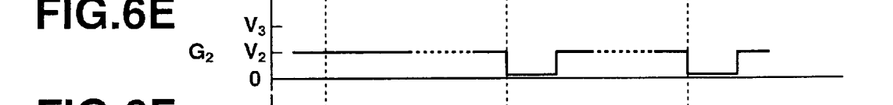
Figure 6F:
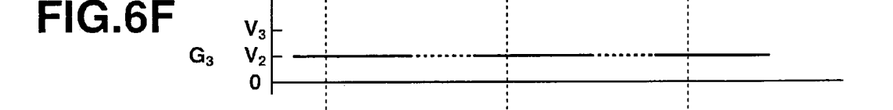
Figure 6G:
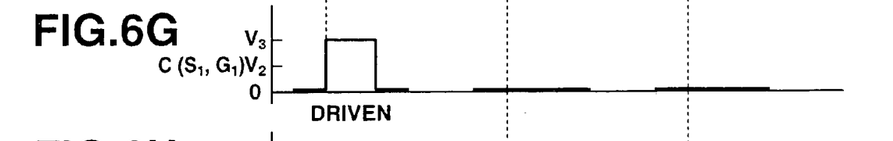
Figure 6H:
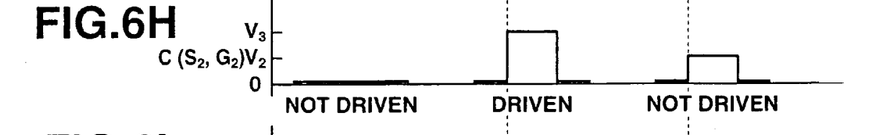
Figure 6I:
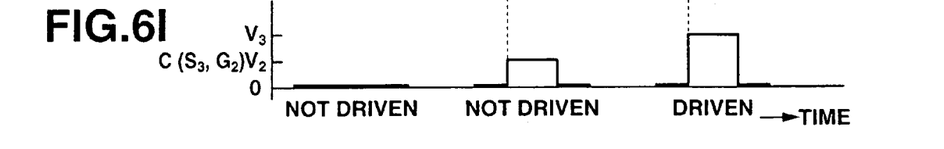

FIG. 5 shows an electrical equivalent circuit diagram of a display device according to the present invention. Viewed from an electrical perspective, the P-type impurity diffusion section 101a of the movable reflective film 101 forms a P-N junction at the interface between the N-type silicon substrate and the P-type impurity diffusion section, and hence this section is regarded as a diode. Consequently, the respective P-type impurity diffusion sections 101a formed in the same substrate are mutually connected by means of diodes operating in inverse directions, and therefore mutually insulated wiring is achieved. In the diagram, $S_1$, $S_2$ and $S_3$ indicate wiring terminals formed by P-type impurity diffusion sections 101a which are connected to the terminal section 110 on the silicon substrate 1 side. $G_1$, $G_2$ and $G_3$ indicate terminals of wires 203 formed by the transparent electrodes which are connected to the terminal section 201 on the glass substrate 2. Furthermore, in electrical terms, the transparent electrodes 203 and the impurity diffusion sections 101a of the movable reflective films which intersect with these transparent electrodes 203 can be regarded as forming capacitors, and accordingly, they are labelled as "capacitor C" in this diagram.

FIG. 6 is a timing chart showing the timing of the voltages applied to the silicon substrate terminals ($S_1$, $S_2$ and $S_3$) and the glass substrate terminals ($G_1$, $G_2$ and $G_3$). The capacitor formed at the point where the wire from $S_1$ intersects with the wire from $G_1$ is taken to be $C(S_1,G_1)$, and the potential difference between $S_1$ and $G_1$ is indicated by graph G in FIG. 6. Similarly, the potential differences for $C(S_2,G_2)$ and $C(S_3,G_2)$ are shown respectively by graphs H and I in the diagram.

In FIG. 6, the initial states of the silicon substrate side terminals $S_1$, $S_2$ and $S_3$ and the glass substrate side terminals $G_1$, $G_2$ and $G_3$ are all set to $V_2$ (potential). In this case, the terminal to terminal voltage in each capacitor is 0 volts.

At timing $t_1$ in FIG. 6, since the electric potential at $S_1$ is raised to $V_3$ and the electric potential at $G_1$ falls to 0V, the potential difference of the capacitor C ($S_1$, $G_1$) assumes $V_3$, and then the movable reflective film makes contact with the transparent electrode and assumes a driven state. Since the electric potential at $S_2$, $S_3$, $G_2$, $G_3$ remains at the initial value of V2, the potential difference at $C(S_2,G_2)$ and $C(S_3,G_2)$ remains 0V and therefore these capacitors is not driven (non-driven state).

At timing $t_2$, the electric potential at $S_2$ is raised to $V_3$ and the electric potential at $G_2$ falls to 0V, and therefore $C(S_2,G_2)$ assumes a potential difference of V3 and adopts an operational state. Since the other electric potentials remain at the initial voltage of V2, the potential difference of $C(S_1,G_1)$ remains at 0V and this capacitor is not driven, and furthermore, although the potential difference of $C(S_3,G_2)$ becomes $V_2$, it is not driven because this potential difference does not reach the potential difference $V_3$ at which contact is made.

In a similar manner, at timing $t_3$, $S_3$ is set to $V_3$ volts and $G_2$ is set to 0 volts, whereby $C(S_3,G_2)$ assumes a driven state and $C(S_1,G_1)$ and $C(S_2,G_2)$ remain in a non-driven state.

Figure 8A:
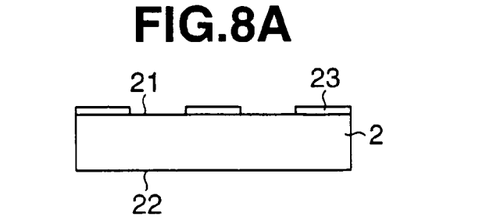
FIG. 8 is a process diagram showing steps for manufacturing a second substrate constituting the optical modulator according to the present invention.
Figure 8B:
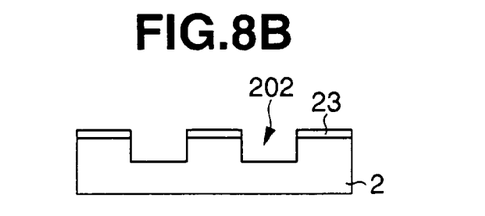
Figure 8C:
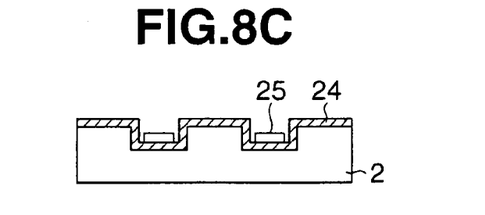
Figure 8D:
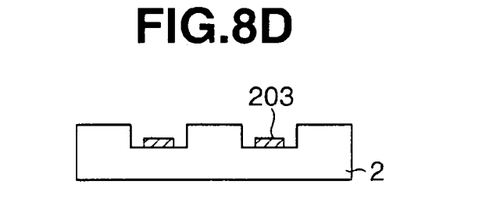
Figure 8E:
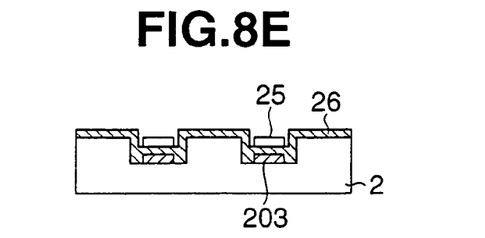
Figure 8F:
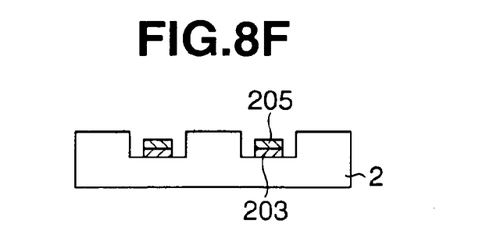
Figure 9:
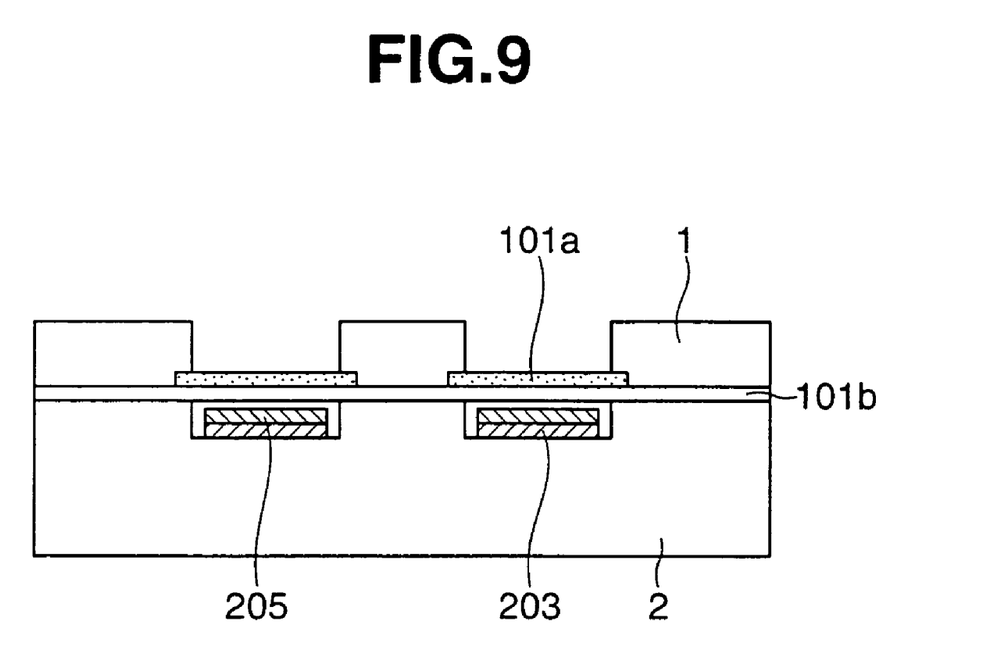
FIG. 9 is a cross-sectional view showing an optical modulator according to the present invention.

Next, a method of manufacturing the optical modulator according to the present invention is described with respect to FIG. 7 to FIG. 9.

FIG. 7 is a process diagram showing the manufacturing steps for the first substrate constituting an optical modulator according to the present invention, and FIG. 8 is a process diagram showing the manufacturing steps for the second substrate constituting an optical modulator according to the present invention. Moreover, FIG. 9 is a cross-sectional diagram showing an optical modulator according to the present invention manufactured by laying together the first substrate and the second substrate obtained respectively by the processes in FIG. 7 and FIG. 8, in such a manner that the bottom face of the first substrate and the face of the second substrate on which the groves are formed are mutually opposing.

The method of manufacturing the first substrate is now described on the basis of FIG. 7A to FIG. 7J.

Figure 7A:
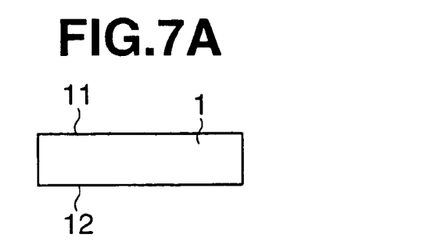
FIG. 7 is a process diagram showing steps for manufacturing a first substrate constituting the optical modulator according to the present invention.

(A) Firstly, the groove forming face 11 of the N-type silicon substrate 1 and the doping face 12 thereof are mirror polished.

Figure 7B:
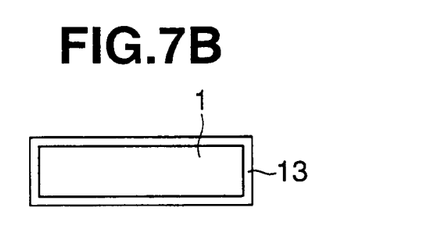

(B) Next, an oxide film ($SiO_2$) 13 is formed using a process such as thermal oxidation, or the like, on the surfaces of the N-type silicon substrate 1. In specific terms, for example, the N-type silicon substrate 1 is placed in a thermal oxidation oven, and oxidation processing is carried out in an oxygen and steam atmosphere, whereby a thermal oxide film 13 of a prescribed thickness is formed on the surfaces of the substrate.

Figure 7C:
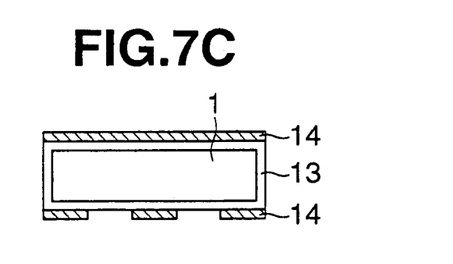

(C) Resist 14 is coated onto the doping face 12 on which the movable reflective film (base section of groove) is to be formed, and patterning is carried out. By this means, the resist is removed from the portions in which the P-type impurity is to be diffused, and the remaining portions are masked by the resist.

Figure 7D:
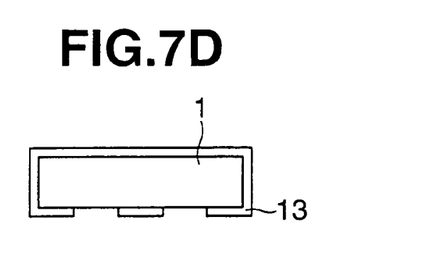

(D) The $SiO_2$ film (silicon oxide film) 13 is etched by means of an etching solution, such as aqueous hydrofluoric acid, or the like, using the resist 14 as a mask, and the substrate 1 is then exposed. The resist 14 coating the substrate is peeled away.

Figure 7E:
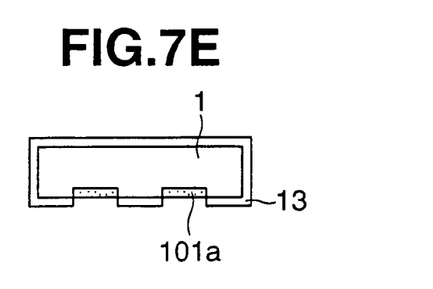

(E) A P-type impurity is diffused into the doping face 12 of the substrate 1, using the $SiO_2$ film 13 as a mask. For example, the impurity is diffused thermally into the exposed region of the substrate 1, thereby forming a boron diffusion layer 101a. The depth of the boron diffusion layer 101a is approximately the same as the thickness of the movable reflective film, and a high-concentration diffusion is obtained wherein the concentration of the diffused atoms is $1 \times 10^{18}$ atom/cm$^3$ or above.

Figure 7F:
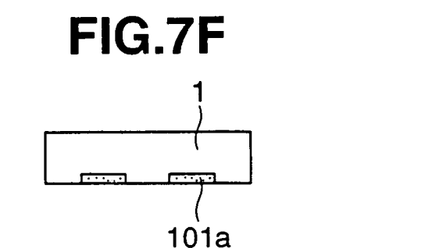

(F) Thereupon, the SiO₂ film 13 is removed from the substrate 1 by means of an etching solution of hydrofluoric acid solution, or the like.

Figure 7G:
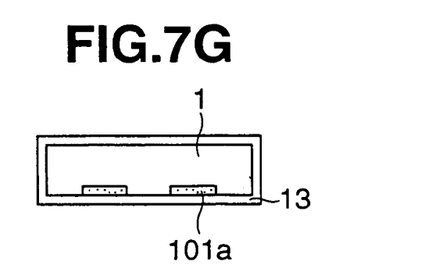

(G) The substrate 1 is coated again with SiO₂ by means of thermal oxidation.

Figure 7H:
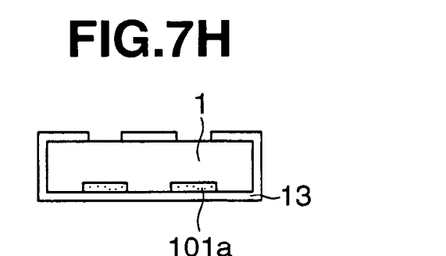

(H) An etching mask for the grooves is formed by patterning the SiO₂ film 13.

Figure 7I:
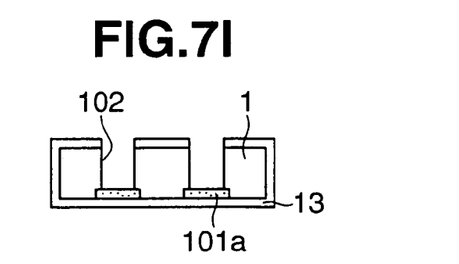

(I) The substrate 1 covered with the mask 13 is then immersed in an aqueous solution of potassium hydroxide, for example, and etching is carried out using the high-concentration boron diffusion layers 101a as etching stoppers, thereby forming grooves 102.

Figure 7J:
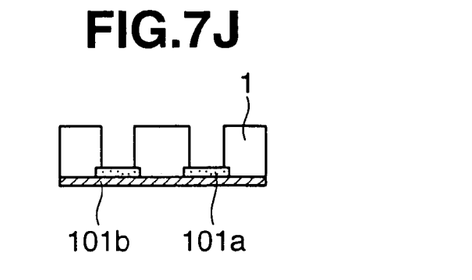

(J) Thereupon, the SiO₂ film used as the mask is removed by means of an etching solution, such as aqueous hydrofluoric solution, or the like. A SiO₂ film 101b is formed at a prescribed thickness on the doping face 12 of the substrate, by means of thermal oxidation, CVD, or the like.

Moreover, it is also possible to use a nitride film, or a gold film, instead of the SiO₂ film, as the etching protection film. If a gold film is used, then chromium may be employed as a foundation layer in order to increase the close contact properties of the gold film.

Furthermore, in the example described above, wet etching was used for the etching steps, but the process is not limited to this, and dry etching may also be used.

Moreover, the example described above referred to a method of manufacturing an optical modulator wherein an N-type silicon substrate is used and a P-type impurity is diffused into the base sections of the grooves, but even if a P-type silicon substrate is used, it is possible to manufacture an optical modulator wherein an N-type impurity is diffused into the base sections of the grooves, by means of a similar method.

Next, the steps for manufacturing a second substrate are described with reference to FIG. 8.

(A) A gold film is formed by sputtering, or another such method, onto the upper face 21 of a glass substrate 2, and a mask for forming grooves is obtained by patterning this film.

(B) The glass is etched by means of hydrofluoric acid, for example, using the gold film 23 as a protective film, thereby forming grooves 202, and the remaining gold film 23 is removed.

(C) A transparent electrode film 24 (for example, ITO) is formed onto the upper face 21 of the substrate 2, and resist 25 is patterned onto the portions remaining inside the grooves, by means of photolithography.

(D) The ITO film is etched by means of an aqueous solution of hydrochloric acid or nitric acid, for example, thereby forming the ITO into transparent electrodes 203 in the base section of each groove 202.

(E) Next, an absorbing film 26 (for example, a tungsten film) is formed and resist 25 is patterned over the potions thereof that remain inside the grooves, by means of photolithography.

(F) The absorbing film 26 is dry etched by means of CF₄ gas, thereby forming absorbers 205 in prescribed portions on the ITO film (transparent electrodes 203).

The etching protection film, etching solution and etching gas are not limited to those described above. Moreover, wet etching and dry etching may be respectively interchanged.

The first substrate and second substrate manufactured by means of the processes described above, are bonded together in respectively aligned positions, as illustrated in FIG. 9. From the viewpoint of achieving good accuracy in the interval between the substrates, it is desirable to use anodic bonding or direct bonding as the method for bonding the substrates together. However, the commonly known prior art method whereby substrates are bonded together by means of an adhesive is not excluded as a possible bonding method.

If anodic bonding is used, then it is particularly desirable that a borosilicate glass is used for the glass substrate. This is because borosilicate glass contains a large number of alkali ions. Moreover, since the borosilicate glass has virtually the same coefficient of thermal expansion as the silicon substrate, there is little distortion at the bonding faces of the substrates, and hence accurate and reliable bonding can be achieved.

In the method for manufacturing an optical modulator described above, each respective process may be replaced by any suitable process commonly known in the prior art, provided that the beneficial effects of the present invention can be achieved thereby.

Moreover, the display device according to the present invention may be manufactured by a similar process to that described above.

The display device according to the present invention may be capable of displaying black and white images, or color images, and is suitable for use as a display panel for a portable telephone, or the like, where low power consumption is demanded.

What is claimed is:

1. An optical modulator comprising:
   a first substrate having at least one first groove on one face thereof, said at least one first groove having a movable reflective film that oscillates in accordance with an electrostatic force formed on the bottom face thereof; and
   a light-transmitting second substrate opposing said first substrate and having at least one second groove provided on the face thereof opposing said first substrate, said at least one second groove extending in a direction approximately orthogonal to said at least one first groove and having a transparent electrode formed on the bottom face thereof;
   wherein said movable reflective film and said transparent electrode form a picture element at an intersection of said first and second grooves.

2. The optical modulator according to claim 1, wherein said movable reflective film is formed from either a conductive film, or a semiconductor film doped with an impurity, or a dielectric film, or a laminated film combining these films.

3. The optical modulator according to claim 1, wherein said first substrate is formed from a semiconductor substrate.

4. The optical modulator according to claim 3, wherein said first substrate is formed from a semiconductor substrate of one polarity, and said movable reflective film is formed from a semiconductor film of the other polarity.

5. The optical modulator according to claim 3, wherein said semiconductor substrate is a silicon substrate.

6. The optical modulator according to claim 1, wherein said first substrate and said second substrate are bonded together by anodic bonding.

7. The optical modulator according to claim 1, wherein said second substrate is made of borosilicate glass.

8. The optical modulator according to claim 1, wherein a light absorber is formed on the upper face of said transparent electrode.

9. A display device formed by incorporating an optical modulator according to claim 1.

* * * * *